May 5, 1925.
C. W. GORMLY
LAWN MOWER
Filed Oct. 20, 1921
1,536,431
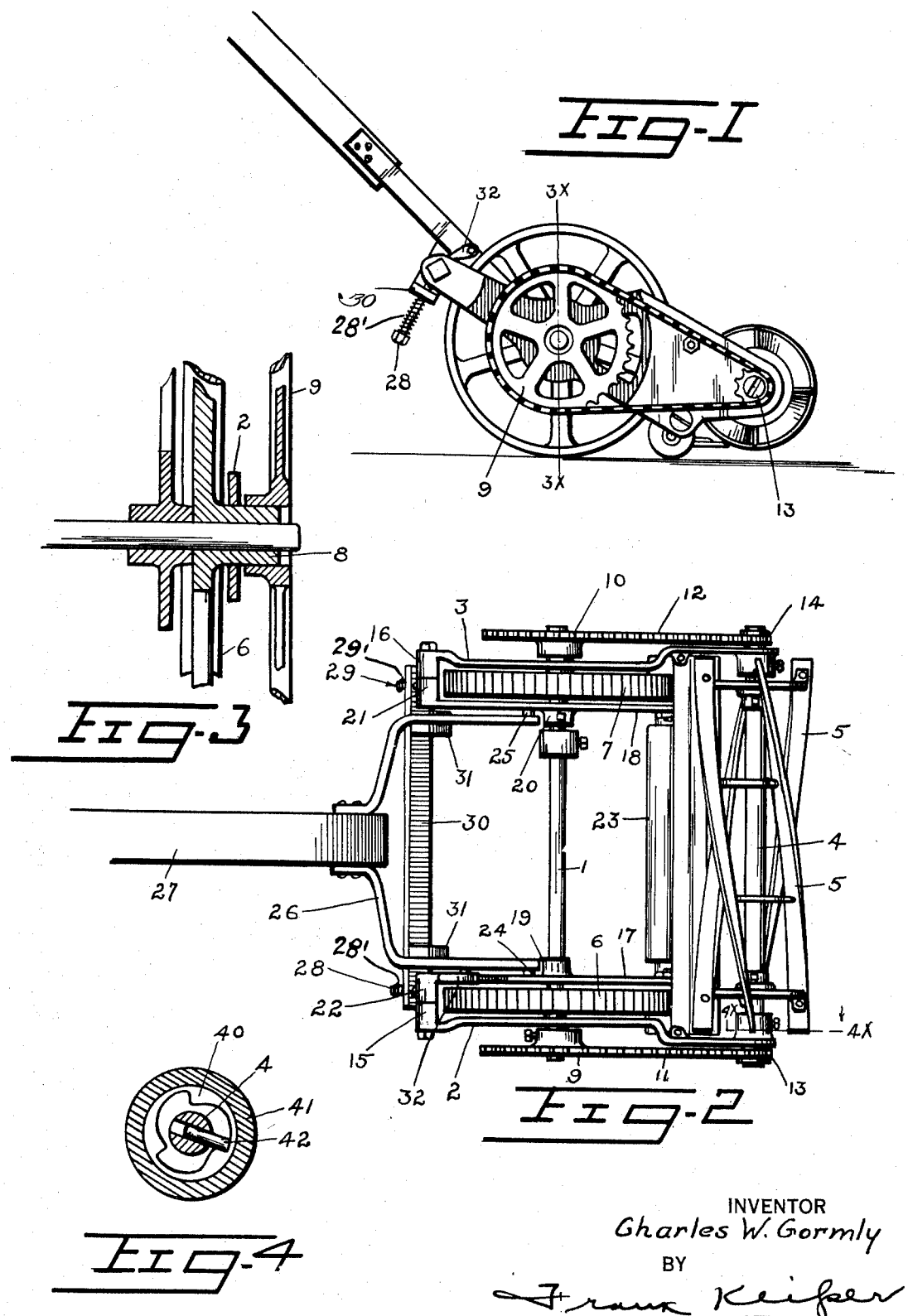
INVENTOR
Charles W. Gormly
BY
Frank Keifer
ATTORNEY Patented May 5, 1925.

1,536,431

UNITED STATES PATENT OFFICE.

CHARLES W. GORMLY, OF MOUNT MORRIS, NEW YORK, ASSIGNOR TO CHARLES WOODS, OF BUFFALO, NEW YORK.

LAWN MOWER.

Application filed October 20, 1921. Serial No. 509,171.

*To all whom it may concern:*

Be it known that I, CHARLES W. GORMLY, a citizen of the United States, residing at Mount Morris, in the county of Livingston and State of New York, have invented certain new and useful Improvements in Lawn Mowers, of which the following is a specification.

The object of this invention is to provide a new and improved form of lawn mower.

This and other objects of the invention will be illustrated in the drawing, described in the specification and pointed out in the claim at the end thereof.

In the drawing:

Fig. 1 is a side elevation of my improved lawn mower.

Fig. 2 is a top plan view thereof.

Fig. 3 is a section on the line $3^x$—$3^x$ of Figure 1.

Fig. 4 is a section through the pawl clutch on the line $4^x$—$4^x$ of Figure 2.

In the drawing like reference numerals indicate like parts.

In the drawing, reference numeral 1 indicates the stationary axle on which are carried the side bars 2 and 3, which bars are formed with a depressed middle portion, the bars being flared outward at each end and provided with inwardly extending bosses. On the forward end of the side bars 2 and 3 the shaft 4 is mounted for rotation and carries the cutters 5, which cutters are made wider or longer than the tread of the wheels 6 and 7. The wheels 6 and 7 turn freely on the shaft 1. Each of the wheels is provided with a hub 8 that extends outwardly, on which hubs are keyed the sprocket wheels 9 and 10 so as to rotate therewith and be driven thereby. About the two sprocket wheels are trained chains 11 and 12, which drive the pinions 13 and 14 keyed to the shaft 4 by which the cutting cylinder is rotated.

The side bars 2 and 3 at their upper ends are provided with bosses 15 and 16. Inside of the driving wheels 6 and 7 are provided the bars 17 and 18, which bars have bosses 19 and 20 midway thereon that engage with the shaft 1, to which they are fastened with set screws, and at the upper ends are provided with the bosses 21 and 22.

The bosses 15 and 16 and 21 and 22 are perforated so that the bosses 15 and 22 and 16 and 21 are fastened together by bolts as shown. In this manner the bars 2 and 17 and 3 and 18 are rigidly fastened together. On the lower ends of the bars 17 and 18 is mounted the roller 23, which roller is mounted to turn in suitable blocks (not shown) and can be adjusted up and down on the bars 17 and 18 in any suitable manner to fix the position of the cutting cylinder.

On the bars 17 and 18 are formed the lugs 24 and 25 on which the yoke 26 of the handle 27 can swing. Extending downward from the bosses 21 and 22 are the studs 28 and 29 on which is mounted the cross bar 30, which bar is normally held in the position shown in Figure 1 by means of springs 28' and 29' on the studs 28 and 29 respectively. This bar 30 carries the blocks 31 and 31, on which rests the yoke 26 of the handle 27 and by which the handle is supported as the mower is tilted up at the forward end. Because of the yielding support of this bar, if the wheels 6 and 7 go over a stone, the bosses 21 and 22 rise but do not raise the yoke 26, for that rests on the blocks 31, 31 on the bar 30, which bar yields compressing the springs on the studs 28 and 29.

On the yoke 26 is pivotally mounted the pawl 32 which engages with the ratchet face on the bar 17 and holds the handle 27 at various degrees of elevation above the horizontal. The pawl may be engaged with the serrations or ratchet face on the bar 17 so as to support the yoke 26 at any desired position on this bar. This permits the operator to tilt the machine while still holding the handle in a convenient operating position so as to raise the cutter and cut only the tops of the grass, if the grass is high, after which the pawl may be released and the cutter may be run close to the ground for cutting the grass close to the ground.

In Figure 4 I have shown the pawl clutch 40 mounted to turn in the boss 41. This pawl clutch is integral with the sprocket wheel 13 and is driven thereby. On the end of the shaft 4 is carried a pawl 42 which moves radially across the end of the shaft and can be engaged on either end by the shoulders of the cams in the clutch 40. One of these clutches is provided at each end of the shaft 4.

I claim:

In a lawn mower, the combination of a shaft, drive wheels mounted to turn on said shaft, inner and outer frame bars fixed on the sides of each drive wheel and rigidly held together at their rear ends, bolts depending from the rear ends of the frame bars, a connecting bar suspended from said bolts, a spring surrounding each of said bolts to yieldably hold said connecting bar against the under side of the rear ends of said frame bars, a yoke pivoted on the inner frame bars, a handle on said yoke, a revoluble cutter mounted to rotate between the forward ends of the outer frame bars, a roller mounted to rotate between the forward ends of the inner frame bars, a pawl pivoted on the side of said yoke and adapted to engage one of said inner frame bars to support said yoke on said inner frame bar, said pawl being adapted to be disengaged from said inner frame bar and allow said yoke to rest on said connecting bar instead of said side bar.

In testimony whereof I affix my signature.

CHARLES W. GORMLY.